United States Patent [19]

Travis

[11] 4,199,632

[45] Apr. 22, 1980

[54] COMPRESSED WOOD IMPLEMENT HANDLES AND METHOD OF MAKING

[76] Inventor: Charles F. Travis, P.O. Box 1785, Greenville, S.C. 29602

[21] Appl. No.: 696,687

[22] Filed: Jun. 16, 1976

[51] Int. Cl.[2] .......... B32B 3/10

[52] U.S. Cl. .......... 428/54; 428/60; 428/535; 144/309 D; 156/221; 273/167 R; 273/77 A; 273/73 F; 145/2 R; 145/61 R; 81/3.4; 139/185

[58] Field of Search .......... 428/535, 54, 60; 273/167 R, 77 A, 73 F; 81/3.4; 145/2 R, 61 R

[56] References Cited

U.S. PATENT DOCUMENTS

| | | | |
|---|---|---|---|
| 1,403,143 | 1/1922 | Atwood et al. | 273/73 F |
| 3,455,587 | 7/1969 | Onions | 273/77 A |
| 3,686,061 | 8/1972 | Brown et al. | 428/60 X |
| 3,698,445 | 10/1972 | Trains | 139/185 |
| 3,788,929 | 1/1974 | Huttunen | 123/122 |
| 3,977,933 | 8/1976 | Sadshige | 428/458 X |

*Primary Examiner*—P. C. Ives
*Attorney, Agent, or Firm*—B. P. Fishburne, Jr.

[57] ABSTRACT

For added strength and efficiency, the handles of impact or striking implements are weighted near their striking ends by the addition thereto of carefully preweighed supplemental veneers intervened with main veneers or by providing in a solid handle blank a head portion of increased thickness prior to compression. The mass of the handle at the striking end is effectively increased.

5 Claims, 7 Drawing Figures

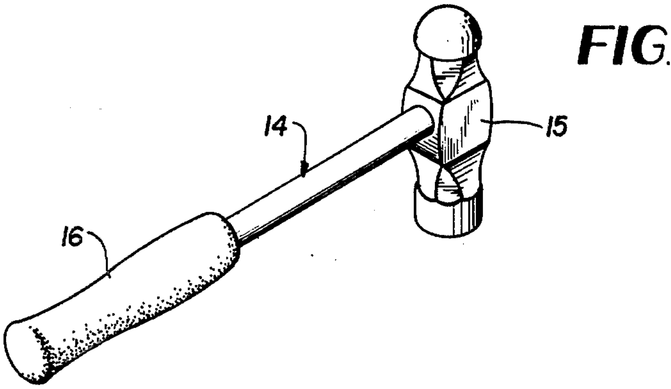
FIG.1
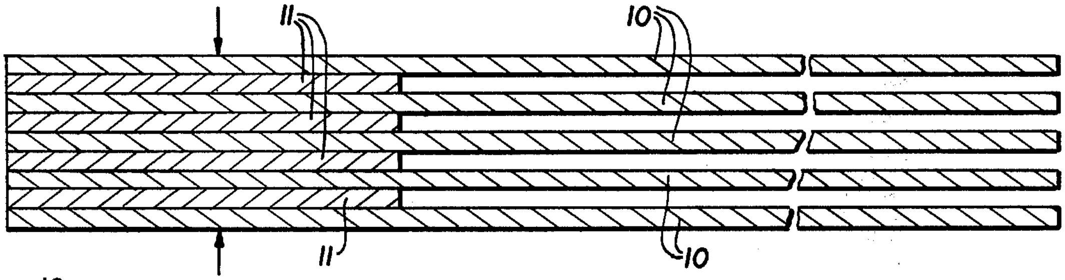
FIG.2
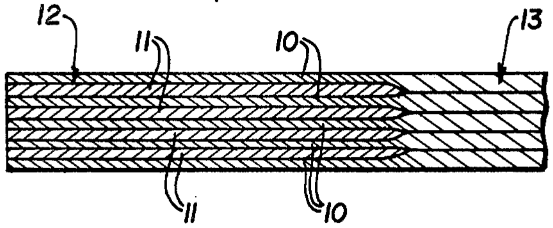
FIG.3
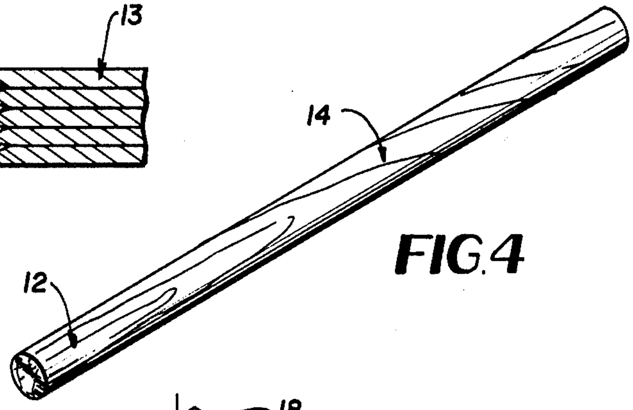
FIG.4
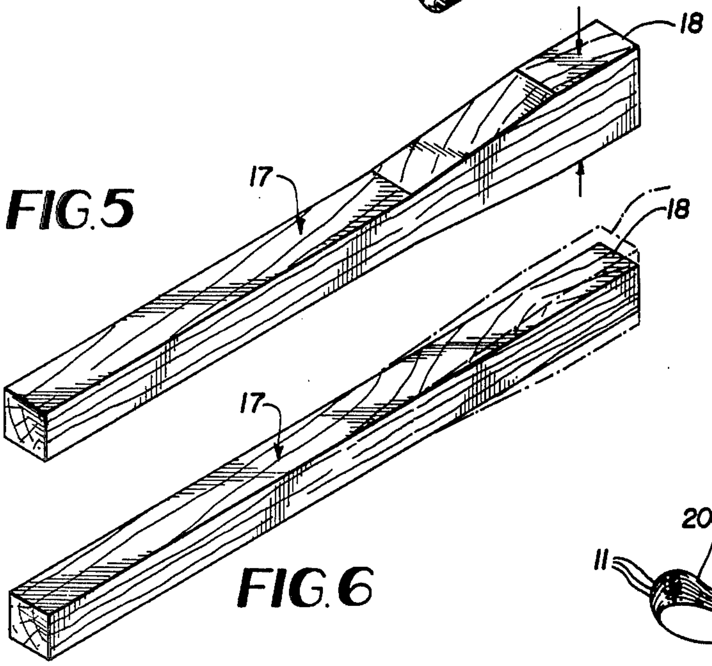
FIG.5
FIG.6
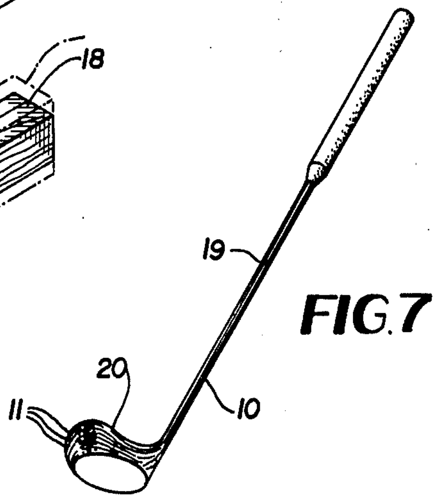
FIG.7

COMPRESSED WOOD IMPLEMENT HANDLES AND METHOD OF MAKING

BACKGROUND OF THE INVENTION

Traditionally, impact tools such as hammers and axes have poorly conceived, relatively weak and inefficient handles. Breakage of hardwood striking tool handles close to the head is quite common and presents a dangerous problem both to the user of the tool and to others in the nearby vicinity. Such breakage may be caused by a number of factors in natural wood handles, such as poor wood grain orientation, knots and other natural internal defects. More often, breakage close to the implement head is caused by the fact that the handle is purposely reduced in cross sectional size where it enters the bore of the head to provide more metal and more weight at the striking end. While increased striking mass is achieved in this manner, there is far too great a sacrifice of handle strength and therefore the traditional design is not efficient.

In recognition of the fact that handle balance is desirable, axe handles and the like are frequently formed with an enlargement immediately rearwardly of the metal head to add more weight. However, as stated, the forward tip of the handle ahead of the enlargement is reduced to allow the use of more metal but with a great weakening of the handle which frequently results in breakage and serious accidents.

The objective of this invention is to cure the above and other defects of the prior art and to provide a safe and durable handle for striking implements which will be properly balanced and will have increased striking power without sacrifice of strength. Also, the weight and balance of the handle can be accurately controlled in the invention to meet the needs of particular applications. The mass of the handle near its striking end can be increased by the addition of carefully pre-weighed wood veneers prior to compression of the handle. In the case of a solid handle blank, the striking end portion may be enlarged prior to compression to increase the mass in this critical region.

The invention is applicable to various types of impact devices and is not restricted to any particular class of implements.

Other features and advantages of the invention will become apparent during the course of the following description.

BRIEF DESCRIPTION OF DRAWING FIGURES

FIG. 1 is a perspective view of a striking tool having a handle formed in accordance with the present invention.

FIG. 2 is an enlarged fragmentary longitudinal cross section taken through stacked hardwood veneers prior to compression thereof.

FIG. 3 is a similar view showing the veneers following compression and lamination according to known techniques.

FIG. 4 is a perspective view of a finished handle constructed from laminated compressed veneers according to a preferred form of the invention.

FIG. 5 is a perspective view of a handle blank formed from solid natural wood prior to compression.

FIG. 6 is a similar view of the handle blank following compression.

FIG. 7 is a perspective view of a golf club made in accordance with the invention from compressed laminated wood veneers.

DETAILED DESCRIPTION

Referring to the drawings in detail wherein like numerals designate like parts, attention is directed to FIG. 2 showing an implement handle blank formed from a multiplicity of stacked natural wood veneers 10 with added veneers 11 being provided between the main veneers 10 in the leading or striking head portion of the handle blank. The veneers 10 and 11 may be hickory, ash, oak or the like and while their thicknesses may vary somewhat, the veneers are all preferably of uniform thickness in the range of approximately 1 to 5 mm. The main veneers 10 extend continuously for the entire length of the handle blank, which length may vary to meet particular needs. The added short veneers 11 extend only in the region where the implement head will be mounted in the finished handle.

Preferably, the veneers have their grains extending in the same direction longitudinally of the handle for maximum strength. In some cases, alternating veneers may have their grains running in different directions with satisfactory results.

By carefully pre-weighing the handle blank veneers prior to compressing the handle blank, it is possible to completely and accurately control the weight, balance and performance of the resulting tool handle and to add a specified amount of weight to the handle in the region of the striking implement head.

Following the pre-weighing and stacking of the wood veneers to form a handle blank as shown in FIG. 2, the blank is compressed and laminated into a permanently bonded unit until the specific gravity of the striking head zone adjacent the added veneers 11 is in the range of 0.085 to 1.4 kg/cdm. The bonding agent employed to laminate the veneers permanently as an integral structure may be any suitable commercial resin. The wood compressing and laminating techniques are well known in the art and per se do not form the subject matter of the invention and need not be described in further detail. Prior U.S. Pat. No. 3,698,445, issued Oct. 17, 1972, to Travis, discloses wood compression techniques of the kind employed herein. U.S. Pat. No. 3,788,929, issued Jan. 29, 1974, to Huttunen, discloses a method for plasticizing wood to facilitate the subsequent shaping and/or compression thereof, and if desired the teachings of this patent may also be employed in the present invention to improve the quality of the product. However, it is not essential in the invention to follow the techniques of the Huttunen patent and the veneer densification and lamination may be successfully achieved solely by means of compression in the presence of a suitable bonding agent, followed by conventional mechanical shaping of the final handle or implement.

FIG. 3 shows the handle blank following the compression of the described hardwood veneers to the above-specified density or specific gravity. At this stage of the process, the implement head end portion 12 of the handle blank has its density materially increased in comparison to the remaining rearward body portion 13 of the handle blank which is also compressed to a lesser degree and permanently bonded or laminated. The blank is now of uniform thickness throughout its length and ready for shaping mechanically into the desired final handle form 14 shown in FIG. 4 and also in FIG.

1. FIG. 1 also shows a striking implement head 15 mounted on the leading end portion 12 of the handle having the increased mass or density and a suitable hand grip 16 mounted on the rear end of the handle. While a hammer is illustrated in FIG. 1, it should be understood that the handle according to the invention is applicable to various types of impact tools and implements, such as axes, mallets and sporting clubs, including golf clubs. In any such case, the balance of the tool is accurately established by careful pre-weighing of veneers and added striking force is achieved by increasing the weight of the forward portion of the handle at 12 adjacent the implement head 15. The strength of the handle is greatly increased because of the use of stacked compressed veneers and, moreover, because the handle is of uniform cross section throughout its length and does not have to be reduced at its point of application to the implement head to achieve added mass at this point, as in the prior art. The structure, in accordance with the invention, is much more durable and less likely to break and therefore much safer. It is also entirely practical to manufacture and feasibly economical.

FIGS. 5 and 6 show a modification of the invention in which a handle blank 17 is formed from a solid section of hardwood rather than from stacked veneers. To achieve comparable results in terms of strength and increased head density, the forward end portion 18 of the solid wood blank 17 has increased thickness in one direction prior to compression. FIG. 6 shows the blank 17 after compression, when the forward portion 18 is compressed to an increased density range of approximately 0.85 to 1.4 kg/cdm, as compared to the normal density of the hardwood making up the remainder of the handle blank 17 which is substantially uncompressed. As is well known, the densities of hardwood may vary as much as 20% to 25% and therefore the invention in both embodiments thereof allows direct controlling of density or mass in the important striking head end of the handle. Following compression of the blank 17 in FIG. 6, the compressed wood handle may be conventionally shaped for use as in FIG. 4 and FIG. 1. While the laminated veneer embodiment is superior in quality and durability, nevertheless the solid wood handle made in accordance with the invention is far superior to the traditional prior art and embodies the chief attributes of the invention, namely a controlled weight increase in the striking head end and uniform cross section throughout the length of the handle to avoid fracture during impact.

FIG. 7 illustrates the application of the invention to a golf club whose entire shaft 19 and club head 20 may be formed from laminated hardwood veneers substantially as described in connection with FIGS. 2 through 4. In the case of the golf club, the extra veneers 11 shown in FIGS. 2 and 3 are inserted between the main veneers in the region of the club head only and the main veneers 10 extend within the head 20 and also for the entire length of the integral club shaft 19. The resulting club is compressed and laminated with a binding resin, and the club head can be pre-weighted with the desired number of added veneers 11 prior to compression. By pre-weighing the veneers, very fine club balance can be achieved, as well as strength and durability. The laminated all-wood club can be competitive in performance and durability to the higher cost metal shaft clubs which require a costly joining of the shaft to the club head formed of wood or other material. The applicability of the invention to golf clubs and other like impact devices, as well as to tool handles, is readily apparent without further description.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. An impact delivery member comprising an elongated unitized body portion, said body portion consisting of a multiplicity of main full length wood veneers in superposed relationship extending from end-to-end in the body portion, and a second multiplicity of comparatively short partial length supplemental wood veneers intervened with the main full length veneers, the supplemental veneers being positioned at one end portion only of said body portion to increase the mass and density of the body portion at such end portion following compression of all of the veneers, adhesive resin disposed between all of the veneers in said body portion and all of the veneers being compressed normal to their major surfaces and throughout the entire length of the body portion to such a degree that the body portion has imparted to it a substantially uniform thickness throughout its length and is unitized, the compressed body portion at said one end portion having the supplemental veneers being of increased density and mass compared to the remainder of said body portion having only said main full length wood veneers.

2. An impact delivery member as defined in claim 1, and all of the main and supplemental veneers having their wood grains extending in one direction and said one direction being along the major longitudinal axis of the impact delivery member.

3. An impact delivery member as defined in claim 1, wherein the member is an impact tool handle.

4. An impact delivery member as defined in claim 1, wherein the member is a striking club.

5. An impact delivery member as defined in claim 1, wherein the member is a golf club.

* * * * *